Oct. 7, 1924.

E. G. STRONG

PRESS

Filed Sept. 7, 1922  2 Sheets-Sheet 1

1,510,718

Oct. 7, 1924. 1,510,718

E. G. STRONG

PRESS

Filed Sept. 7, 1922 2 Sheets-Sheet 2

Inventor:
E. G. Strong,
His Attorneys

Patented Oct. 7, 1924.

1,510,718

UNITED STATES PATENT OFFICE.

ERNEST G. STRONG, OF CANTON, OHIO, ASSIGNOR TO THE TIMKEN ROLLER BEARING COMPANY, OF CANTON, OHIO, A CORPORATION OF OHIO.

PRESS.

Application filed September 7, 1922. Serial No. 586,671.

*To all whom it may concern:*

Be it known that I, ERNEST G. STRONG, a citizen of the United States, resident of the city of Canton, county of Stark, and State of Ohio, have invented a certain new and useful Improvement in Presses, of which the following is a specification.

My invention relates to presses and has for its principal object to provide for punching a plurality of holes in a circular object, such as a roller bearing cage, at one operation or for performing other operations thereon at a plurality of points at one time.

Heretofore it has been common practice to punch the holes of roller bearing cages one at a time, which practice is expensive and produces many cages wherein the holes are improperly spaced or wherein the bridges are distorted. Likewise, it has heretofore been common practice to "wing" or break down the edges of the bridges of the cage in a plurality of operations. The present invention consists in a machine having a plurality of punches or of shaping dies arranged in a circular series and provided with a common operating means, whereby all of the holes of a roller bearing cage may be punched in one operation or all of the bridges thereof may be "winged" in one operation, according as the machine is equipped with cutting punches or shaping punches or dies.

The invention further consists in the parts and combinations of parts hereinafter described and claimed.

Figure 1:
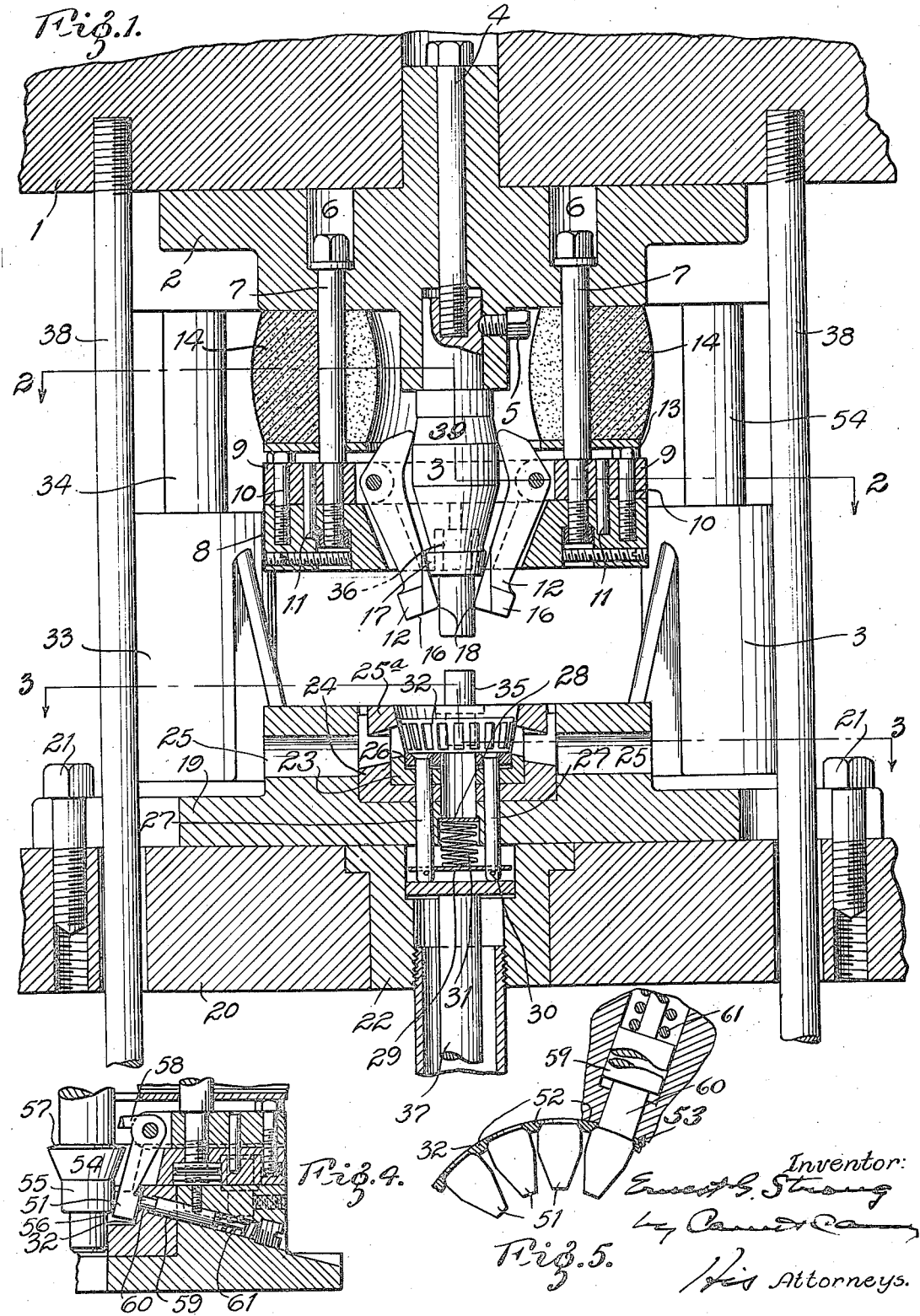
Figure 2:
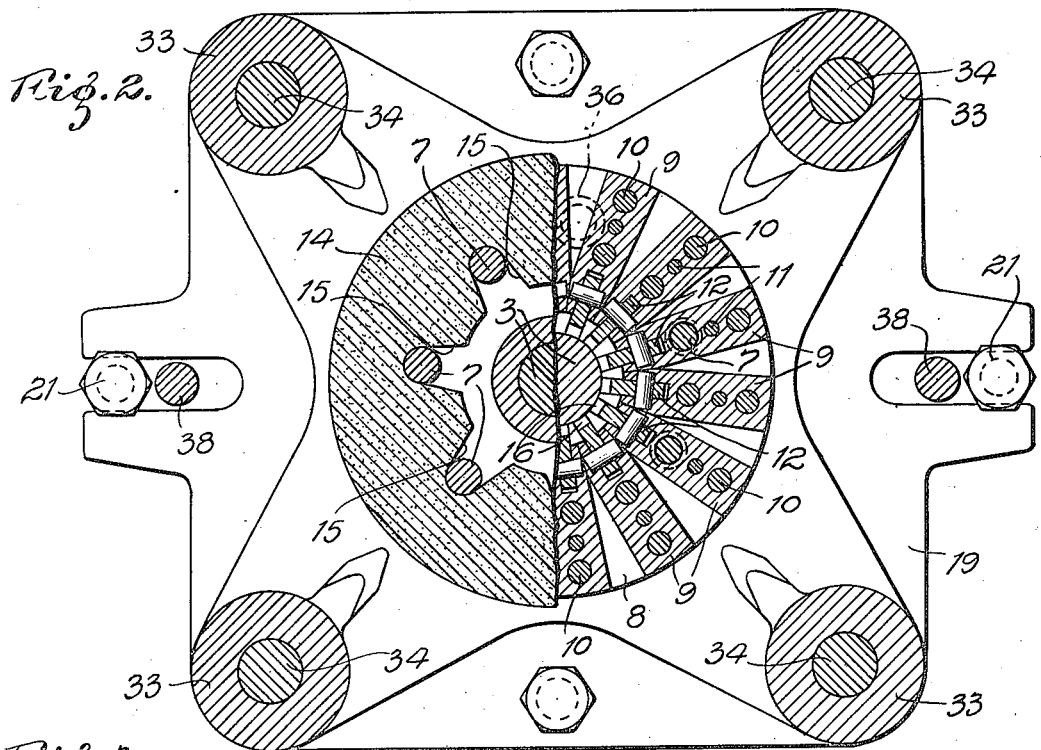
Figure 3:
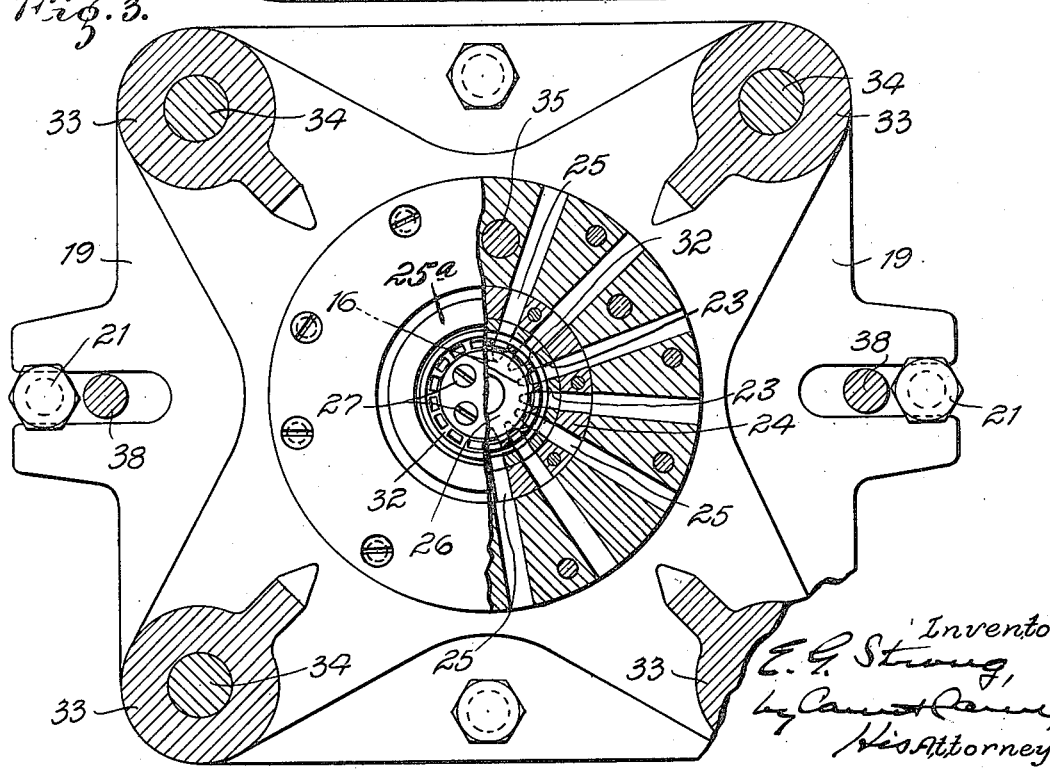

In the drawings, which form part of this specification and wherein like reference numerals indicate like parts wherever they occur, Fig. 1 is a vertical section through a press embodying my invention, Figs. 2 and 3 are horizontal sections on the lines 2—2 and 3—3 respectively of Fig. 1, Fig. 4 is a fragmentary sectional view of a slightly modified form of the invention, and Fig. 5 is a fragmentary sectional view through part of a cage in said modified machine, showing the shaping punches operating on the bridges of the cage.

The ram 1 of a press of any suitable construction is provided with a plate 2 that constitutes a carrier for the press tools.

To the carrier 2 is secured a mandrel or plunger 3 as by an axially disposed bolt and a transverse screw 5. The carrier 2 is provided with recesses 6 in which are mounted the heads of bolts 7 that extend downwardly through suitable holes in said carrier 2. To the threaded lower ends of the bolts 7 are secured an annular plate 8.

To the upper surface of the annular plate 8 are secured a plurality of radially disposed blocks 9 as by screws 10 and dowels 11. The inner ends of the blocks 9 are bifurcated and have punches 12 pivotally secured therebetween. The punches shown in Figs. 1 to 3 are perforating punches and are adapted to punch the holes of a roller bearing cage or the like. Resting on the screws 10 that secure the blocks 9 to the annular plate 8 is an annulus 13 on which is mounted an annular pad 14 of rubber that fills the space between said annulus 13 and the lower surface of the carrier 2. The rubber pad 14 is provided with suitable recesses 15 to accommodate the bolts 7.

The punches 12 are in the form of bent levers. The punching portion 16 is formed at the lower end of the outer edge of one arm of the punch.

The mandrel 3 is provided near its lower end with a cam surface 17 adapted to ride over the inner lower end portions 18 of the punches 12 and force them outwardly, so that the punches will operate on the work.

A die support 19 is secured to the base 20 of the press as by screws 21, said base 20 preferably having a central opening in which is mounted a suitable bushing 22 that is counterbored at its upper end. A die 23 is mounted in a suitable holder 24 that is mounted on the die support 19. Said die holder 24 and die support 19 are provided with alining openings 25 that are adapted to receive the punchings from the cage. The die 23 is provided with openings adapted to cooperate with the punches 12 to form the holes in the cage. Mounted in the top of the die holder 24 is an annular ring 25 that constitutes the top portion of the die.

A knockout plate 26 is mounted in the bottom of the die 23 on pins 27 that extend through the die 23, die holder 24 and die support 19 into the bore in the bushing of the base of the press.

The lower end portion of the central opening of the die support 19 is enlarged and a small plug 28 is mounted therein. A plate 29 rests on pins 30 or the like near the ends of the pins 27 that support the knockout plate 26, and between said plug 28 and said plate 29 is mounted a spring 31, that tends to keep the knockout plate 26 in its lowermost position in the die, in which position a cage 32 mounted on said knockout plate 26 is in position to be operated on by the punches 12.

The die support 19 is provided with a plurality of up-standing members 33 that have axial bores in which are slidably mounted guide rods 34 that are secured to the carrier 2. Said guide rods 34 and up-standing members 33 cooperate to keep the parts of the press in proper alinement.

The die support 19 is further provided with guide pins 35 that fit in bushings 36 mounted in suitable recesses in the plate 8, thus properly alining the punches during the working stroke thereof.

A plunger 37 is mounted in the bore of the bushing 22 beneath the pins 27 that support the knockout plate 26, and said pins 27 are kept in contact with the end of said plunger 37 by the pressure of the spring 31. Vertically disposed bars 38 on the ram 1 are connected by any suitable means (not shown in the drawings) with said plunger 37 so that the plunger is raised and lowered with the ram. When said plunger 37 is lowered the knockout plate 26 is free to assume its lowermost position in the die, so that a cage 32 thereon is in position to be punched. When said plunger 37 is raised, the knockout plate 26 is forced upwardly so that the cage is free from the die.

The operation of the press is as follows:

When the parts are in the position shown in Fig. 1, an unperforated cage is placed on the knockout plate, and the ram 1 is lowered. As the ram 1 is lowered, the knockout plate 26 is forced downwardly so that the cage is properly positioned in the die 23. The annular plate 8 and the punches 12 move downwardly until the plate 8 strikes against the top of the die support 24. The continued downward movement of the ram moves the mandrel 3 downwardly, the rubber pad 14 being compressed and permitting downward movement of the mandrel after the movement of the plate 8 and punches 12 has been stopped. The cam surface 17 of the mandrel forces the punches outwardly, punching the holes in the cage 32.

After the holes have been punched, the ram 1 moves upwardly. The mandrel is provided with a conical surface 39 near its upper end which presses against the short upper arms of the punches 12 and thus forces the lower ends of the punches inwardly, permitting them to be withdrawn from the cage 32. The continued upward movement of the ram raises the plate 8 and punches 12 clear of the die support, and plunger 37 raises the knockout plate 26, leaving the perforated cage 32 as shown in Fig. 1, in position to be withdrawn from the die.

In Figs. 4 and 5 is illustrated a slightly modified form of the invention in which the punches 51 are shaping punches or shaping dies that are adapted to "wing" the bridges 52 of the perforated cage 32, that is to break down or level off the corners thereof to adapt them to cooperate with the rolls of a roller bearing. The punches 51 have shoulders 53 adapted to strike the edges of adjoining bridges 52 and break them down. The mandrel 54 that actuates the punches 51 is similar to the mandrel above described, having a portion 55 adapted to strike the lower end portions 56 of the punches to force them outwardly and having a portion 57 adapted to strike the short upper arms 58 of the punches to force the lower ends of the punches inwardly, out of engagement with the work.

In order to properly locate the work, a locating pin 59 is mounted in a suitable recess extending through the die and die holder and having an end 60 that fits closely in a pocket of the cage to hold the cage in position. A spring 61 is mounted in said recess to force the pin towards the die.

The press shown has numerous advantages. It punches all of the holes of a cage or breaks down the edges of all the bridges in one operation, thus saving time and expense. The punches are accurately located and the holes of the cages are thus properly spaced. The unpunched metal of the cage is firmly supported during the punching operation and distortion thereof is prevented.

Obviously, numerous changes may be made without departing from my invention and I do not wish to be limited to the precise construction shown.

What I claim is:

1. In a device of the kind described, a work support adapted to receive an annular conical body, a plurality of punches arranged in a circular series and means for moving them endwise into said annular body and for swinging them radially outward to operate thereon, said means actuating said punches simultaneously.

2. In a device of the kind described, a work support adapted to receive an annular conical body, a plurality of punches arranged in a circular series and means for moving them endwise into said annular body and for swinging them radially outward to operate thereon, said means actuating said punches simultaneously, said means comprising a member disposed centrally of said punches and adapted to move them radially.

3. In a press, a gang of punches comprising bent levers arranged in a circular series, and a common actuating means therefor, including a mandrel disposed centrally of said punches to actuate the same, said mandrel having a conical portion adapted to force one arm of each of said punches simultaneously outward to engage the work and said mandrel also having a conical surface adapted to force the other arm of each of said punches outward, whereby said first mentioned arms are withdrawn from the work.

4. A press comprising a ram, a die support, a die mounted thereon adapted to receive the annular conical work, a plurality of punches pivotally supported beneath said ram, said punches being arranged in a circular series, and a mandrel secured to said ram and disposed centrally of said punches, the stroke of the ram being such that the axial movement of said punches is stopped before the end of the stroke of the ram, whereby the continued movement of the ram and mandrel causes said mandrel to force the ends of said punches outwardly.

5. A press comprising a ram, a die support, a die mounted thereon adapted to receive the annular conical work a plurality of punches pivotally supported beneath said ram, said punches being arranged in a circular series, and a mandrel secured to said ram and disposed centrally of said punches, the stroke of the ram being such that the axial movement of said punches is stopped by said die support before the end of the stroke of the ram, whereby the continued movement of the ram and mandrel causes said mandrel to force the ends of said punches outwardly and means for keeping said punches and die in alinement.

6. A press comprising a ram, a die support, a die mounted thereon adapted to receive the annular conical work, a plurality of punches comprising bent levers pivotally supported beneath said ram, said punches being arranged in a circular series and a mandrel secured to said ram and disposed centrally of said punches, the stroke of the ram being such that the axial movement of said punches is stopped by said die support before the end of the stroke of the ram, said mandrel having a conical portion whereby the continued movement of the ram and mandrel causes said mandrel to force the ends of said punches outwardly, and said mandrel having a second conical portion adapted to engage the upper arms of the punches on the upward stroke of the ram to cause the lower ends of the punches to withdraw from the work.

7. A press comprising a ram, a die support, a die mounted thereon adapted to receive the annular conical work, an annular plate mounted beneath said ram, a plurality of radially disposed bifurcated blocks mounted on said plate, a rubber pad between said blocks and the bottom of said ram, a plurality of punches comprising bent levers pivotally secured between the bifurcated ends of said block, said punches being arranged in a circular series and a mandrel secured to said ram and disposed centrally of said punches, the stroke of the ram being such that the axial movement of said punches and plate is stopped by said plate abutting against die support before the end of the stroke of the ram, continued movement of said ram compressing said rubber pad whereby the continued movement of the ram and mandrel causes said mandrel to force the ends of said punches outwardly.

8. In a press, a die, a plate resting in said die and constituting a support for the work, pins secured to said plate and extending downward through holes in said die, a second plate secured to the ends of said pins, a spring bearing downward against said second plate and means for raising said plate, said means including a plunger mounted below said pins and connected with the ram of the press.

9. In a press of the kind described, the combination of a plurality of punches disposed in a circular series and adapted to operate on the bridges of a cage for roller bearings or the like to break down the corners thereof, with a pin having an end portion adapted to fit into the pocket between two of said bridges and a spring adapted to force said pin toward a cage mounted in said press, said pin being in alinement with one of said punches whereby said cage may be held in proper position to be operated on by said punches.

10. A press comprising a ram, a die support, a die mounted thereon adapted to receive the annular conical work, a plurality of punches comprising levers pivotally supported beneath said ram on a carrier provided therefor and secured to said ram, said punches being arranged in a circular series, and a mandrel secured to said ram and disposed centrally of said punches, the stroke of the ram being such that the axial movement of said punches is stopped by said die support before the end of the stroke of the ram, whereby the continued movement of the ram and mandrel causes said mandrel to force the ends of said punches outwardly and means for keeping said punches and die in alinement, said means comprising a plurality of upstanding members on said die support, each having a vertical bore and a plurality of rods projecting downward from said carrier and each fitting in the bore of one of said upstanding members.

11. A press comprising a ram, a die support, a die mounted thereon adapted to receive the annular conical work, a carrier secured to the underside of said ram, an annular plate supported beneath said carrier, a plurality of radially disposed bifurcated blocks mounted on said plate, a rubber pad between said blocks and the bottom of said ram, a plurality of punches comprising bent levers pivotally secured between the bifurcated ends of said block, said punches being arranged in a circular series, a mandrel secured to said ram and disposed centrally of said punches, the stroke of the ram being such that the axial movement of said punches and plate is stopped by said plate abutting against die support before the end of the stroke of the ram, continued movement of said ram compressing said rubber pad whereby the continued movement of the ram and mandrel causes said mandrel to force the ends of said punches outwardly, and means of keeping said punches and die in alinement, said means comprising a plurality of upstanding members on said die support, each having a vertical bore, a plurality of rods projecting downwardly from said carrier, each fitting in the bore of one of said upstanding members and guide pins on said die support, each fitting in a recess provided therefor in said annular plate.

Signed at Canton, Ohio, this 2nd day of September, 1922.

ERNEST G. STRONG.